United States Patent

[11] 3,577,888

| [72] | Inventor | Rudolf Awarth<br>Munich, Germany |
|------|----------|----------------------------------|
| [21] | Appl. No. | 806,457 |
| [22] | Filed | Mar. 12, 1969 |
| [45] | Patented | May 11, 1971 |
| [73] | Assignee | Bayerische Motoren Werke<br>Aktiengesellschaft<br>Munich, Germany |

[54] SELF-LOCKING DIFFERENTIAL GEAR, ESPECIALLY FOR MOTOR VEHICLES
7 Claims, 2 Drawing Figs.

| [52] | U.S. Cl. | 74/711 |
|------|----------|--------|
| [51] | Int. Cl. | F16h 1/44 |
| [50] | Field of Search | 74/711, 710, 710.5 |

[56] References Cited
UNITED STATES PATENTS

| 2,569,533 | 10/1951 | Morgan | 74/711 |
| 2,796,941 | 6/1957 | Hill | 74/710.5X |

Primary Examiner—Arthur T. McKeon
Attorney—Craig, Antonelli, Stewart & Hill

ABSTRACT: A self-locking differential gear especially for motor vehicles in which differential gears rotatably arranged in a differential gear housing mesh with gears nonrotatably connected with the axle shafts; clamping bodies are provided between the differential gear housing and at least one axle shaft within annular spaces; the clamping bodies are in operative connection with hollow cylindrical friction surfaces coordinated to the differential gear housing and with support surfaces coordinated to the axle shaft whereby the clamping bodies are constructed as sections of a ring with outer surfaces matched to the friction surfaces and with internal inclined surfaces that are different from a coaxial cylinder.

Patented May 11, 1971
3,577,888
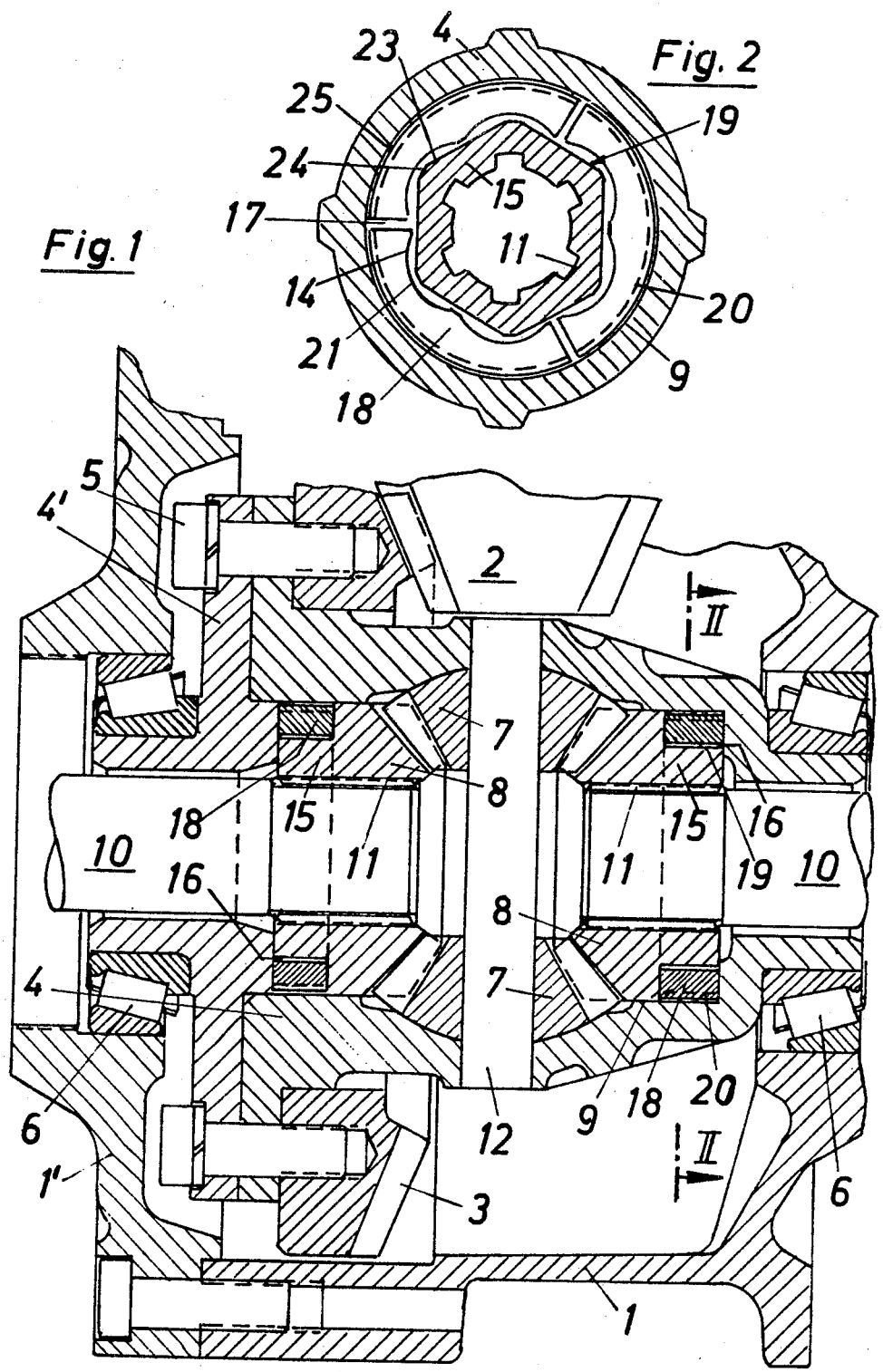

SELF-LOCKING DIFFERENTIAL GEAR, ESPECIALLY FOR MOTOR VEHICLES

The present invention relates to a self-locking differential gear, especially for motor vehicles, with differential gears rotatably arranged in a differential gear housing which are in direct engagement with axle shaft gears nonrotatably mounted on a respective axle shaft or drive shaft and with clamping bodies arranged in coaxial annular spaces between the differential gear housing and at least one axle shaft, which clamping bodies are in operative connection with a hollow cylindrical friction surface coordinated to the axle gear housing and with support surfaces coordinated to the axle shaft or shafts.

Self-locking constructions of differential gears of this type are known in the prior art in which the clamping bodies are constructed as cylindrical rollers and are guided by means of a cage between friction surface and support surfaces. Only a line contact exists thereby in each case between the friction surface and the clamping bodies so that locally very high specific surface loads and high wear appearances occur. The length of life of these structural parts is therefore very small.

Additionally, high requirements are made as regards tolerances of the structural parts because the position and location of the support surfaces, the spacing of the cage apertures and the dimensions of the cylinder rollers have to be matched very accurately to each other in order to assure proper operation.

It is the aim of the present invention to so construct a self-locking differential gear of the type of construction mentioned above that it contains only few structural parts constructed in a simple manner and provided with large friction surfaces subjected to low loads and slight requirements as to manufacturing tolerances. The underlying problems are solved in accordance with the present invention in that the clamping bodies are sections of a ring with cylindrical outer surfaces matched to the friction surface and with inner inclined surfaces deviating from a concentric cylinder.

The clamping bodies may thereby be made initially in the form of a closed ring and may be machined and thereupon may be formed by splitting up into annular sections whereby the spacing necessary for the operation results between the ring sections. The sum of the cylindrical outer surfaces of the ring sections may thereby have nearly the same surface magnitude as the counterfriction surfaces. A low specific surface load is assured thereby. The individual ring sections may adjust themselves to the coordinated support surfaces whereby the complete and full function of each individual clamping body is always assured.

A construction of the clamping bodies which can be manufactured in a particularly simple manner essentially consists, according to a further feature of the present invention, in that the inclined surfaces of the clamping bodies are formed by cylindrical indentations or recesses.

For the purpose of a favorable force introduction into the clamping bodies, provision is made according to the present invention that the number of clamping bodies amounts to one-half of the edges of a polygonal profile forming the support surfaces and that each two adjacent edges of the polygonal profile project into two respective recesses or indentations of each clamping body.

For a rapid buildup of the transmittable friction forces, the present invention still provides finally that the clamping bodies are provided at the friction surfaces thereof with spirally shaped oil displacement channels or grooves whereby it is assured that the lubricating oil disposed between the friction surfaces can be displaced rapidly and the metallic friction effect starts to act without considerable delays.

Accordingly, it is an object of the present invention to provide a self-locking differential gear, especially for motor vehicles, which avoids by simple means the aforementioned shortcomings and drawbacks encountered in the prior art.

Another object of the present invention resides in a self-locking differential gear which is characterized by relatively long length of life due to relatively small specific surface loads and small resulting wear appearances.

A further object of the present invention resides in a self-locking differential gear which makes relatively low requirements as to accuracy in dimensions of the various component parts while providing relatively large friction surfaces requiring acceptable tolerances.

A still further object of the present invention resides in a self-locking gear which permits a rapid buildup of the friction forces adapted to be transmitted while providing at the same time a favorable force introduction into the clamping bodies.

These and further objects, features, and advantages of the present invention will become more obvious from the following description when taken in connection with the accompanying drawing which shows, for purposes of illustration only, one embodiment in accordance with the present invention and wherein:

FIG. 1 is a cross-sectional view through a differential gear for motor vehicles with an automatic locking mechanism in accordance with the present invention; and FIG. 2 is a partial cross-sectional view through the locking mechanism in FIG. 1, taken along line II–II of FIG. 1.

Referring now to the drawing wherein like reference numerals are used throughout the two views to designate like parts, the differential gear illustrated in the two FIGS. consists of a gear housing 1 with a lateral cover 1'. It contains a driving pinion 2, a ring gear 3 and a differential gear housing 4 rotating together with the ring gear 3 and a differential gear housing 4 is rigidly connected by means of bolts 5 with the ring gear 3. The differential gear housing 4 is also provided with a cover 4' and is supported in the gear housing 1, 1' by means of tapered roller bearings 6. The differential gear housing 4 contains a pair of differential bevel gears 7 and axle shaft bevel gears 8 which are in mutual meshing engagement. The axle shaft bevel gears 8 are supported in cylindrical recesses 9 of the differential gear housing 4 and are connected by a spline-tooth arrangement 11 with a respective axle shaft 10 for the further transmission of the rotary movement initiated by the driving pinion 2. The differential bevel gears 7 are rotatably supported on a shaft 12 arranged transversely to the axle shafts 10. The axle shaft bevel gears 8 are provided on the back side opposite their teeth with an offset hub 15 whose circumferential surface is constructed as polygonal profile generally designated by reference numeral 19 and having a hexagonal cross section. One annular space 16 each is thereby formed between the hub 15 of the axle shaft bevel gears 8 and the cylindrical recesses 9. Three clamping bodies 18 are arranged in each of the annular spaces 16 which have the form of sections of a ring with cylindrical outer surfaces 25 and with internal inclined surfaces 14, each formed by two cylindrical recesses or indentations 21. A spacing 17 exists in the circumferential direction between the clamping bodies 18 which is formed in that the clamping bodies are made from a prefabricated closed ring by radial separating cuts. In the circumferential direction, the clamping bodies 18 are rotatably guided to a limited extent with respect to the hub 15 of the axle shaft bevel gears 8 in that each two adjacent flattened off edges 24 of the polygonal profile 18 engage into the two recesses of a respective clamping body 18. The clamping bodies 18 are matched on the outer surfaces 25 thereof to the hollow cylindrical surfaces of the recesses 9 in the differential gear housing 4 and are provided with spirally shaped oil displacement channels 20. Thus, both the axle shaft bevel gears 8 as also the clamping bodies 18 are guided in the recesses 9.

OPERATION

The operation of the self-locking differential gear is as follows:

With the same rotation of the differential gear housing 4 and of the axle shafts 10 and thus with differential bevel gears 7 and axle shaft bevel gears 8 standing still in the differential housing 4, the clamping bodies 18 inside of the annular space 16 assume a loose position determined by the weight thereof and the centrifugal force acting on the same. With differential rotational speeds of the two axle shafts 10, the rotational speed of the differential gear housing 4 and therewith also of the friction surface formed by the recesses 9, deviates from the rotational speed of the hub 15 and therewith of the clamping bodies 18 with the external surfaces 25 thereof. The clamping bodies 18 are thereby taken along at the outer surfaces 25 thereof in one direction and support or brace themselves with the inclined surfaces 14 thereof against the flattened off edges 24 of the polygonal profile 19. As a result of the continuous relative rotation of the hubs 15 with respect to the differential housing 4, the edges 24 increasingly press the clamping bodies 18 against the friction surfaces formed by the recesses 9 of the differential housing 4. The usually present lubricating film between the friction surfaces is—assisted by the oil displacement channels 20—interrupted and a gradually increasing braking effect between the clamping bodies 18 and the differential gear housing 4 takes place. The magnitude of the brake effect is dependent on the existing effective angle of the inclined surfaces 14 with respect to the edges 24 of the hub 15 abutting against the same. The thus-achieved brake effect makes it possible during the spinning of a drive wheel of a motor vehicle to transfer automatically a drive torque corresponding to the brake effect to the other drive wheel in a known manner and to set the motor vehicle thereby into motion also under poor road conditions or keep it in motion. Also during sharp curve drives with slight loads of the driving wheel on the inside of the curve, the drive of the driving wheel on the outside of the curve is assured thereby.

The brake effect disappears automatically if a uniform rotational movement of the axle shafts 10 and of the differential housing 4 is again established or if a slight overtaking of the described relative movements of the structural parts takes place in the opposite direction. The edges 24 thereby reduce the pressure thereof on the inclined surfaces 14 so that a lubricating oil film again builds up between the friction surfaces in the recesses 9 and a practically frictionless sliding of the clamping bodies 18 in the differential gear housing 4 can take place.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A self-locking differential gear, especially for motor vehicles, including a differential gear housing, differential gears rotatably arranged in the differential gear housing, axle shafts operatively associated with the differential gear housing, axle shaft gears nonrotatably connected with the respective axle shafts and the differential gears being directly in engagement with the axle shaft gears, and clamping body means located between the differential gear housing, and at least one axle shaft within concentrically arranged annular spaces, a hollow cylindrical friction surface being rotatably fast with the differential gear housing, wherein the clamping body means is capable of driving engagement with the hollow cylindrical friction surface and with support surfaces formed on a polygonal profile means which is rotationally fast with a respective axle shaft and concentrically surrounded by the hollow cylindrical friction surface, characterized in that the clamping body means are constructed as ring sections having substantially cylindrical external surfaces matched to the hollow cylindrical friction surface and with internal inclined surfaces different from a coaxial cylinder.

2. A differential gear according to claim 1, wherein the inclined surfaces of the clamping body means are formed by substantially cylindrical indentations.

3. A differential gear according to claim 2, wherein the number of clamping body means amounts to one-half the number of edges of the polygonal profile means, and in which two mutually adjacent edges of the polygonal profile means protrude into two corresponding indentations of each clamping body means.

4. A differential gear according to claim 3, wherein the clamping body means are provided at the outer surfaces thereof with spirally shaped oil displacement channels.

5. A differential gear according to claim 1, wherein the number of clamping body means amounts to one-half the number of edges of the polygonal profile means, and in which two mutually adjacent edges of the polygonal profile means protrude into two corresponding indentations of each clamping body means.

6. A differential gear according to claim 5, wherein the clamping body means are provided at the outer surfaces thereof with spirally shaped oil displacement channels.

7. A differential gear according to claim 1, wherein the clamping body means are provided at the outer surfaces thereof with spirally shaped oil displacement channels.